(No Model.)

J. BUCKNER.
ELECTRIC LAMP POST.

No. 578,595. Patented Mar. 9, 1897.

WITNESSES:
A. D. Harrain
P. W. Pezzetti

INVENTOR:
J. Buckner
by Wright Brown & Quinby
Attys.

THE NORRIS PETERS CO., PHOTO-LITHO., WASHINGTON, D. C.

UNITED STATES PATENT OFFICE.

JAMES BUCKNER, OF BOSTON, MASSACHUSETTS, ASSIGNOR TO THE BOSTON ELECTRIC INSULATED POLE COMPANY, OF SAME PLACE.

ELECTRIC-LAMP POST.

SPECIFICATION forming part of Letters Patent No. 578,595, dated March 9, 1897.

Application filed June 8, 1896. Serial No. 594,659. (No model.)

*To all whom it may concern:*

Be it known that I, JAMES BUCKNER, of Boston, in the county of Suffolk and State of Massachusetts, have invented certain new and useful Improvements in Electric-Lamp Posts, of which the following is a specification.

This invention has for its object to provide a simple, strong, and durable post for electric-arc lamps adapted to effectually insulate a lineman supported on the post from the ground.

The invention consists in the improved construction which I will now proceed to describe and claim.

Figure 1:
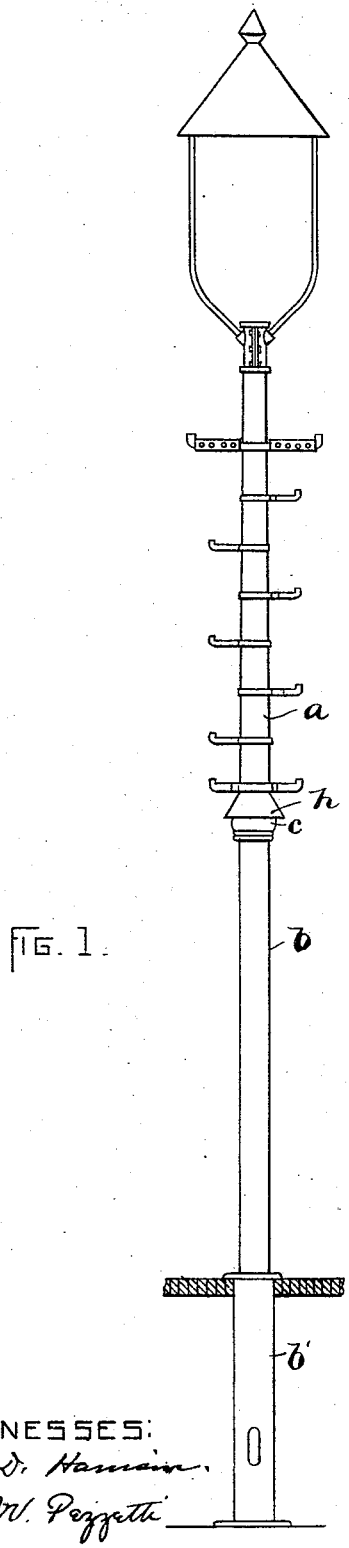
Figure 2:
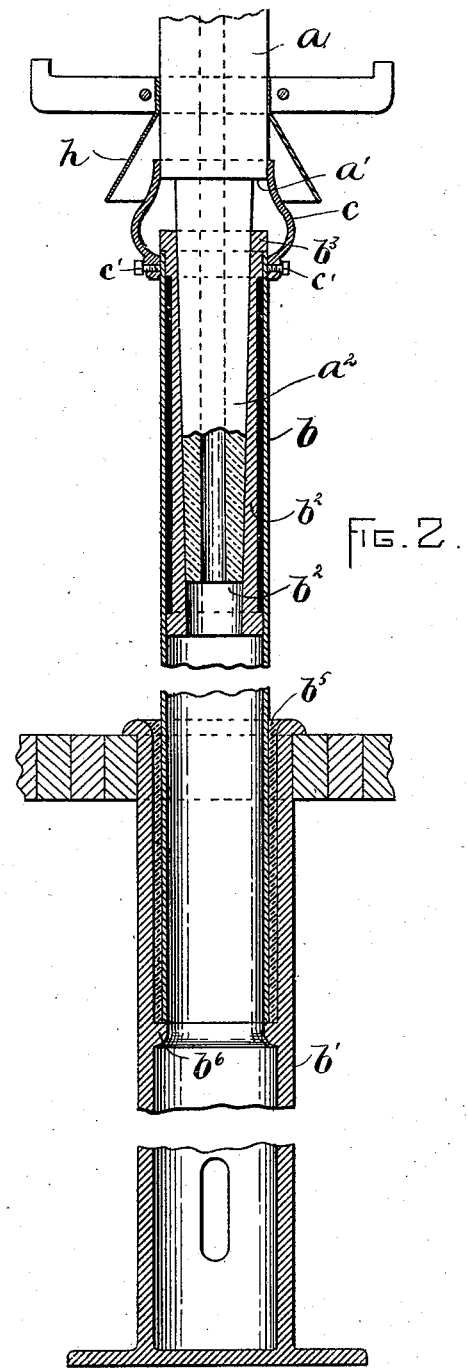

Of the accompanying drawings, forming a part of this specification, Figure 1 represents a side elevation of a lamp-post embodying my improvements. Fig. 2 represents a longitudinal section of the same on a larger scale, portions being broken away.

The same letters of reference indicate the same parts in both figures.

My improved pole is composed chiefly of an elongated wooden section $a$, a tubular base-section $b$, preferably of wrought-iron, and a socket $b'$, adapted to be inserted in the ground to a suitable depth to give a firm support to the post. Said socket is preferably of cast-iron, this material being injuriously affected by moisture when placed below the surface of the ground to a less extent than wrought-iron. The section $b$ projecting above the ground is made of wrought-iron, the toughness of this metal adapting it to resist the blows and rough usage to which it is liable to be subjected. Wrought-iron, however, oxidizes much more rapidly than cast-iron, and it is therefore necessary to take special precautions to protect the part of the section $b$ which enters the socket $b'$ from contact with moisture. This is accomplished by a packing $b^5$ of lead or other suitable material filling the joint between the section $b$ and socket $b'$. To reduce to the minimum the length of this packed joint and therefore the expense and labor of connecting the section $b$ and the socket $b'$, I provide the socket with an internal seat or shoulder $b^6$ near its upper end, said seat supporting the section $b$, thus preventing the said section from entering the socket more deeply than is necessary for a sufficiently firm connection. The shoulder $b^6$ is preferably about eighteen inches below the upper end of the socket, the total length of the socket being about five feet.

In the upper end of the section $b$ is inserted a metal socket-piece $b^2$, having a shoulder $b^3$ resting on the upper end of the tubular section $b$, said socket-piece being internally tapered or reduced in diameter from its upper to its lower end. The wooden section $a$ is tapered or gradually reduced in diameter from a shoulder $a'$ at its lower portion to its upper end, and is provided below the shoulder $a'$ with a tapered extension or shank $a^2$, which is formed to fit the tapered socket $b^2$ and to extend downwardly a considerable distance into said socket and into the tubular section $b$. The shoulder $a'$ on the wooden section is located some distance above the upper end of the socket $b^2$, provision being thus made for a downward movement of the shank $a$ of the wooden section into the socket in case of shrinkage of the wood, a firm and solid bearing of the wooden section on the metal or base section being thus insured.

$c$ represents a collar attached by screws $c'$ to the upper portion of the base-section $b$, said collar extending across the space and between the section $b^2$ and the shoulder $a'$ and covering said shoulder without being attached to the wooden section $a$, so that said section is free to move downwardly in the collar $c$ to any extent that may be required by the shrinkage of the wood.

The upper end of the wooden section is provided with a metallic holder for an electric lamp, (not shown,) said holder and lamp being insulated from the metallic section and ground by the wooden section.

To prevent the entrance of water into the joint between the shank $a'$ and the socket $b^2$, as well as the uninterrupted flow of water from the wooden section onto the metallic section during a rain-storm, in such manner as to conduct the electric current from the lamp-holder to the section $b$, I secure to the wooden section, above the metal section $b$, a water-deflecting hood $h$, which is formed to deflect outwardly any water that flows down the wooden section and cause it to drop outside the section $b$, said hood extending below the upper end of the joint between the wooden section and the collar $c$, so that water cannot flow into said joint.

The hood may be made of galvanized sheet metal and secured to the wooden section in any suitable way. It will be seen that the hood adds to the durability of the post by preventing water from reaching the interior of the metal section $b$ and increases its safety in rainy weather.

I claim—

1. An electric-lamp post comprising the cast-iron socket adapted to be inserted in the ground and provided with an internal seat or shoulder $b^6$ below its upper end, the tubular wrought-iron section having its lower end inserted in said socket and resting on the said seat, and provided at its upper end with a tapered socket, the said cast-iron socket being larger than the portion of the wrought-iron section inserted in it, so that an annular cavity having the shoulder $b^6$ for its bottom is formed between the cast-iron socket and wrought-iron section, a packing, and a wooden section having its lower end fitted in the socket of the wrought-iron section.

2. An electric-lamp post comprising the tubular metallic base-section having a tapered socket, the elongated wooden section having a metallic lamp-holder at its upper end and a tapered shank at its lower end formed to enter the said socket, the wooden shank being self-adjusting in the socket to compensate for shrinkage of the wood, and a hood affixed to the wooden section above the metallic section, said hood being arranged to prevent the entrance of water into the joint between the wooden and metallic sections and to prevent water flowing downwardly on the wooden section from passing uninterruptedly onto the metallic section.

In testimony whereof I have signed my name to this specification, in the presence of two subscribing witnesses, this 25th day of May, A. D. 1896.

JAMES BUCKNER.

Witnesses:
A. D. HARRISON,
P. W. PEZZETTI.